United States Patent
Bossecker et al.

(10) Patent No.: US 7,004,496 B2
(45) Date of Patent: Feb. 28, 2006

(54) OCCUPANT PROTECTION DEVICE

(75) Inventors: Maximilian Bossecker, Huegelsheim (DE); Robert Getz, Ulm (DE); Ulrich Karlbauer, Ulm (DE)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/666,521

(22) Filed: Sep. 22, 2003

(65) Prior Publication Data

US 2004/0130130 A1    Jul. 8, 2004

(30) Foreign Application Priority Data

Sep. 23, 2002    (DE) ............................... 102 44 866

(51) Int. Cl.
*B60R 21/22*    (2006.01)

(52) U.S. Cl. .................................... 280/703.2
(58) Field of Classification Search ............. 280/730.2, 280/730.1, 743.1, 743.2, 728.2
See application file for complete search history.

(56) References Cited

U.S. PATENT DOCUMENTS

| | | |
|---|---|---|
| 5,899,528 A | 5/1999 | Rumpf et al. |
| 6,045,151 A * | 4/2000 | Wu .......................... 280/728.3 |
| 6,254,122 B1 | 7/2001 | Wu et al. |
| 6,416,078 B1 | 7/2002 | Lutz et al. |

FOREIGN PATENT DOCUMENTS

| | | |
|---|---|---|
| DE | 196 25 436 A1 | 1/1998 |
| DE | 296 01 257 U1 | 4/1998 |
| DE | 299 12 825 U1 | 12/1999 |
| EP | 0 854 069 A1 | 7/1998 |
| EP | 0 990 566 A2 | 4/2000 |
| EP | 1 069 004 A2 | 1/2001 |
| GB | 2397048 A * | 7/2004 |
| JP | 10-310017 | 11/1998 |
| WO | WO 98/38067 A1 | 9/1998 |

* cited by examiner

*Primary Examiner*—Faye M. Fleming
(74) *Attorney, Agent, or Firm*—Foley & Lardner, LLP

(57) ABSTRACT

An occupant protection device with an airbag for fastening in a vehicle seat. In order, in an occupant protection device of this type, to make it possible for the seat to be produced and installed very simply and cost-effectively and to achieve reliable deployment of the airbag, the invention proposes that the occupant protection device has a receiving container for the airbag, which container is free of closure flaps, and the opening of the receiving container is covered by a seat cover of the vehicle seat. In this case, the seat cover is to be fastened to a side wall of the receiving container in such a manner that, when the airbag is inflated with gas, the seat cover tears open in the region of the opening of the receiving container.

19 Claims, 9 Drawing Sheets

OCCUPANT PROTECTION DEVICE

BACKGROUND

The invention is concerned with an occupant protection device for fastening in a vehicle seat with a receiving container for an airbag.

An occupant protection device of this type is known, for example, from German patent document no. DE 196 25 436 (incorporated by reference herein). The previously known occupant protection device has a receiving container in which an inflatable airbag is stored. The receiving container is closed by a covering cap. The covering cap has a predetermined breaking point in the form of a groove in its central region. The covering cap breaks open at this predetermined breaking point as soon as the airbag is inflated in the event of a vehicle accident and exerts a corresponding internal pressure on the covering cap. In the previously known occupant protection device, the seat cover is provided with an opening slot in the region of the covering cap of the receiving container. When inflating, the airbag can pass through the seat cover through this slot and can be deployed outside the vehicle seat. The seat cover is fastened in the region of its slot to the covering cap of the receiving container, specifically in such a manner that the two subregions of the seat cover which are separated by the slot are fastened to the covering cap on different sides of the predetermined breaking point. This fastening of the seat cover to the covering cap has the effect that, when the airbag is inflated, the covering cap which breaks open at the predetermined breaking point opens the slot of the seat cover and allows the airbag "to pass".

Another occupant protection device is described in German utility model DE 299 12 825 (incorporated by reference herein). In this previously known occupant protection device, a receiving container for an airbag is likewise provided. The receiving container has a covering part which can swing open and which covers the receiving container. The covering part is swung open by means of pulling means as soon as the airbag is inflated. In order to make it possible for the covering part to swing open, a hinge section is provided about which the covering part is pivoted when appropriately actuated by the pulling means.

A further occupant protection device is described in German utility model DE 296 01 257 (incorporated by reference herein). This previously known occupant protection device has a receiving container which receives an airbag and is closed by a covering cap. The covering cap is mounted in a manner such that it can rotate about a pivot axis and has tearing teeth on its outer side, which faces the seat cover. If the airbag is inflated, then, the airbag presses from the inside against the covering cap and pivots the cap outwards, as a result of which the tearing teeth of the covering cap tear open the seat cover and provide an opening for the airbag.

SUMMARY OF THE INVENTION

The invention is based in part on the object of specifying an occupant protection device which can be produced and installed simply and cost-effectively and ensures reliable deployment of the airbag of the occupant protection device.

Accordingly, provision is made according to the invention for the receiving container for the airbag to be designed in a manner free of closure flaps. Unlike in the above-described, previously known occupant protection devices, this measure enables a component to be left out, as a result of which the production costs are reduced. In the occupant protection device according to the invention, instead of a covering cap the seat cover, which is present in any case, of the vehicle seat is used for covering the "open" receiving container. In order to ensure that the airbag can be deployed correctly, the seat cover has to tear open during inflation of the airbag. This is achieved according to the invention by the seat cover being fastened to a side wall of the receiving container. According to the invention, the effect achieved by the lateral fastening of the seat cover is that, when the airbag is inflated, the seat cover cannot "give way" or "yield" but has to tear open virtually immediately on account of the pressure of the airbag. The tearing-open of the seat cover then creates an opening in the seat cover through which the airbag can pass. An "active" element having tearing teeth for tearing open the seat cover—as is provided in the above-described occupant protection device according to German utility model DE 296 01 257—is therefore not required in the occupant protection device according to the invention.

According to one advantageous refinement of the occupant protection device according to the invention, provision is made for the seat cover to have a predetermined breaking point in the region of the opening of the receiving container. This is because this predetermined breaking point facilitates the tearing-open of the seat cover by the airbag which is being deployed.

Then, in an advantageous manner, the seat cover should be fastened to the side wall in the region of the predetermined breaking point. The effect achieved by this is namely that even a slight pressure or counterpressure of the airbag is sufficient in order to tear open the seat cover.

A predetermined breaking point of this type can be formed in a particularly simple and therefore advantageous manner by means of a seam which closes a slot in the seat cover.

It is advantageous if the seat cover is folded over into the seat interior in the region of the slot forming two adjacent hems, and the adjacent edge regions of the two hems are sewn together. The connection between the seat cover and the side wall of the receiving container can then be produced in a very simple and therefore advantageous manner by at least one of the two hems of the seat cover being connected to the side wall.

Moreover, it is regarded as advantageous if the receiving container is attached at the top of the vehicle seat, specifically with its opening facing the upper end of the backrest of the vehicle seat. The airbag can then be deployed between the head restraint and the vehicle occupant's head.

In order to ensure a particularly rapid tearing-open of the seat cover, it is regarded as advantageous if the seat cover is attached to that side wall of the receiving container which faces the vehicle occupant.

In a particularly simple and therefore advantageous manner, the seat cover can be fastened to the side wall with a plastic strip by the one side of the strip being connected to the seat cover and the other side of the strip being connected to the side wall. In an advantageous manner, the one strip side can be sewn to the seat cover and/or the other strip side can be hooked in on the side wall.

According to a further refinement of the occupant protection device according to the invention, provision is made for the fastening of the seat cover to the side wall to be brought about by at least two hooks which are attached to the side wall and are hooked into holes in the hem of the seat cover. In this further refinement of the occupant protection device, the fastening of the seat cover to the side wall is therefore brought about without a strip.

According to a third advantageous refinement of the occupant protection device according to the invention, provision is made for the fastening of the seat cover to the side wall to be brought about by a snap-in strip into which snap-in hooks fastened to the seat cover snap. A substantial advantage of this third refinement of the occupant protection device can be seen in the fact that the connection between the seat cover and the side wall can be effected in a very simple manner owing to the snap-in strip, since, after installation of the receiving container in the vehicle seat, the snap-in hooks which are fastened to the seat cover have merely to be latched or "snapped" into the snap-in strip.

In this third advantageous refinement of the occupant protection device according to the invention, the snap-in strip can advantageously be fastened directly to the side wall. Instead of this, it may also be fastened to the side wall via further snap-in hooks.

As already discussed above, the seat cover can be connected to the side wall in the region of the predetermined breaking point; instead of this or in addition, the seat cover may also be fastened in the lower region of the side wall, specifically to that side wall of the receiving container which faces the vehicle occupant.

In order to increase the comfort of the vehicle seat for the vehicle occupant, it is regarded as advantageous if a seat cushion is provided between the seat cover and the receiving container. In the region of the opening of the receiving container there should then be at least one predetermined breaking point in the seat cushion, in order to facilitate a tearing-open of the seat cover and seat cushion during inflation of the airbag.

The predetermined breaking point can be provided in a particularly simple manner and therefore in a particularly advantageous manner by at least one hole being provided in the seat cushion, the said hole lying in the region of the opening of the receiving container.

The occupant protection device according to the invention is preferably a "roll-over module" for protecting the head of the occupant in the case of a roll-over of the vehicle. Instead, the occupant protection device according to the invention may also be used as a side-protection module.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
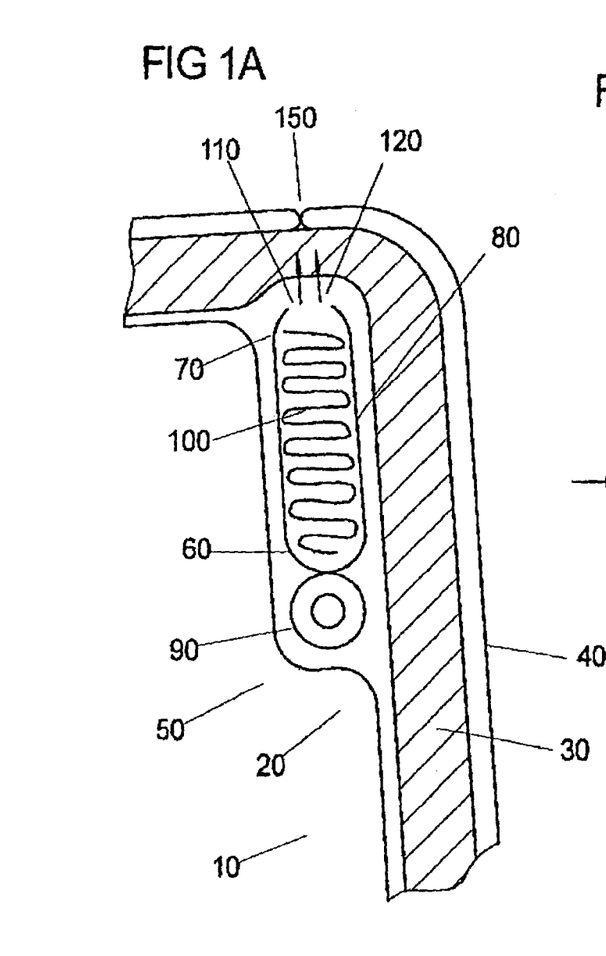
FIGS. 1a and 1b are illustrations of how an airbag would be deployed in an occupant protection device in which the seat cover is not fastened to a side wall of a receiving container.
Figure 1B:
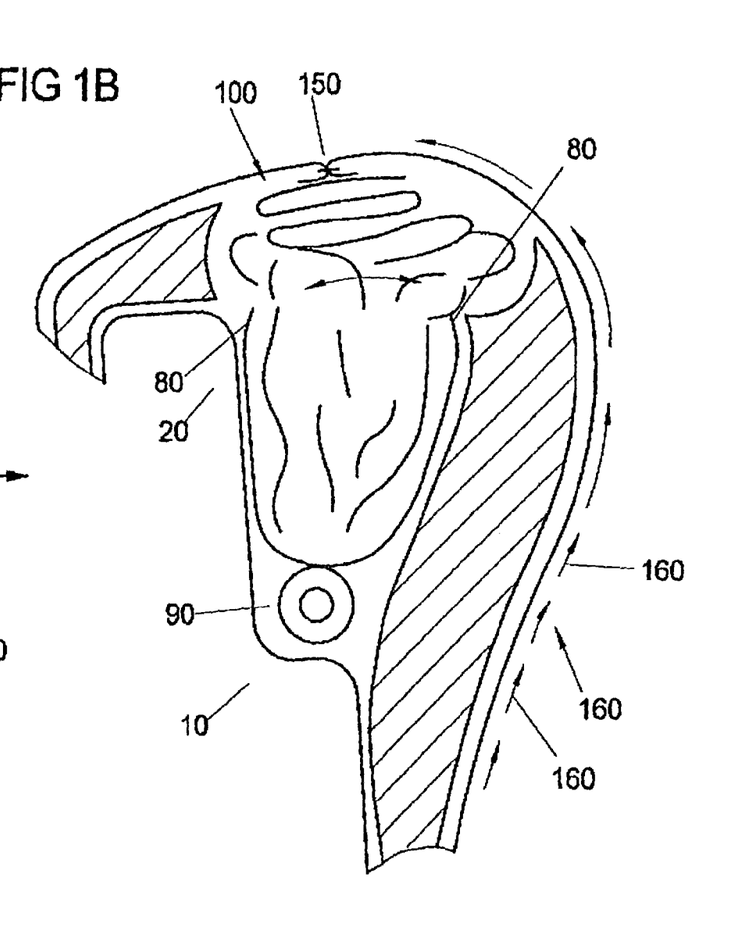

FIGS. 1a and 1b show how an airbag would be deployed in an occupant protection device, in which the seat cover is not fastened to a side wall of the receiving container of the airbag. Specifically, FIGS. 1a and 1b show a vehicle seat 10 which has a backrest frame 20, a seat cushion 30 and a seat cover 40. An occupant protection device 50 which has an airbag module 60 is provided in the vehicle seat 10. The airbag module 60 includes an upwardly open receiving container 70 which is bounded laterally by side walls 80. A filling pipe 90 having a gas generator (not illustrated specifically) is connected to the bottom of the receiving container 70. An airbag 100 which is contained in the receiving container 70 is inflated by the gas generator and the filling pipe 90 and the event of a vehicle accident.

The inflation process will now be described in greater detail with reference to the two FIGS. 1a and 1b. In FIG. 1a, it can be seen that the airbag 100 is still empty of air and is situated entirely in the receiving container 70 of the airbag module 60. If the airbag 100 is then inflated by the gas generator and the filling pipe 90, it has to be deployed in the direction of the opening 110 of the receiving container 70, since a lateral expansion is not possible on account of the side walls 80. This expansion is illustrated in FIG. 1a by means of arrows 120.

FIG. 1b shows how the airbag 100 has partially left the receiving container 70. The seat cushion 30 is pushed apart above the opening 110 of the receiving container 70 by the airbag 100; however, a predetermined breaking point 150 in the seat cover 40 above the opening 110 of the receiving container 70 has not yet been torn open. This is specifically because the seat cover 40 is slightly elastic and so a "migration" of the seat cover occurs. This is illustrated in FIG. 1b by means of arrows 160. This stretching of the seat cover 40 enables the airbag 100 to be at least partially deployed within the vehicle seat 10, which prevents a defined tearing-open of the predetermined breaking point 150 which can be formed, for example, by a tearing seam.

Figure 2A:
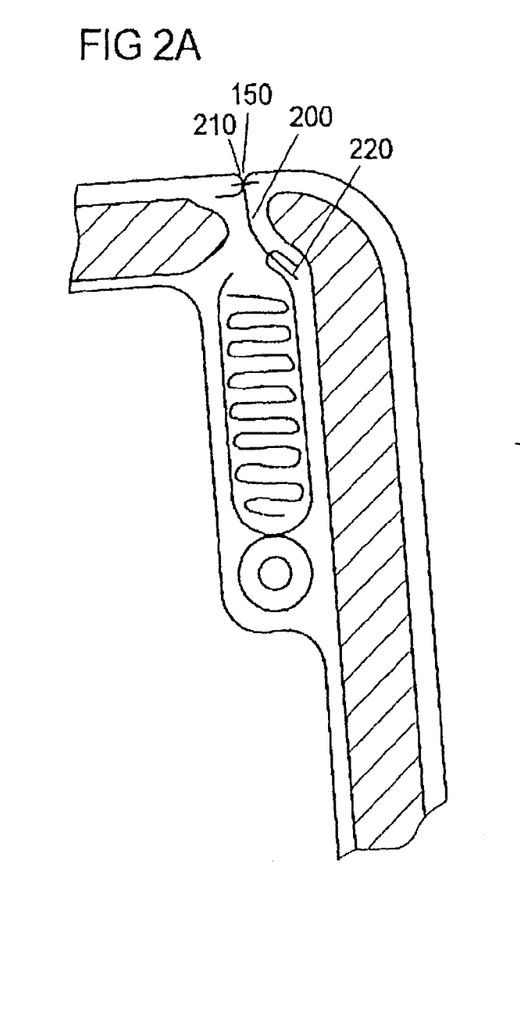
FIGS. 2a, 2b, 2c are illustrations of how an airbag is deployed in an occupant protection device according to the invention in which a fastening of the seat cover is provided.
Figure 2B:
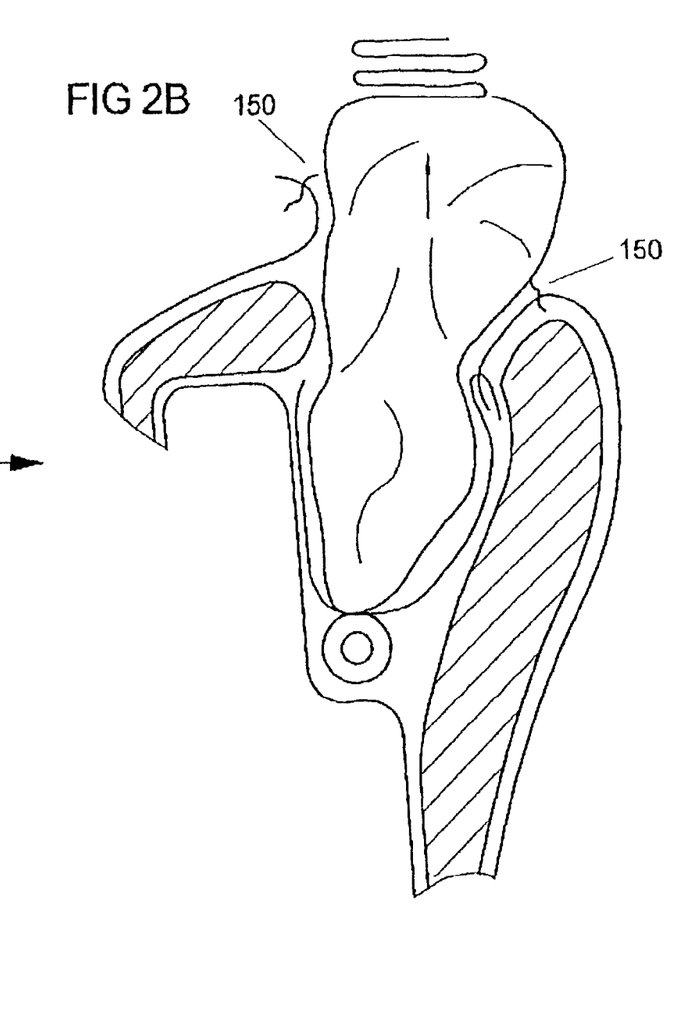

It is explained in FIGS. 2a and 2b, with reference to an exemplary embodiment of the occupant protection device according to the invention, how the "bulging" of the seat cover 40 due to the airbag 100 can be avoided. In FIGS. 2a and 2b and in the other figures explained further below, identical reference numbers are used for identical elements of the occupant protection device.

FIGS. 2a and 2b show, in turn, a vehicle seat 10 with a backrest frame 20, a seat cushion 30 and a seat cover 40. An occupant protection device 50 having an airbag module 60 is integrated in the vehicle seat 10. The airbag module 60 has a receiving container 70 for an airbag 100 which can be filled with gas by means of a gas generator and a filling pipe 90.

In contrast to the occupant protection device according to FIGS. 1a and 1b, in the exemplary embodiment according to FIGS. 2a and 2b, the seat cover 40 is fastened to the side wall 80 of the receiving container 70. FIGS. 2a and 2b therefore show a fastening element 200 which is fastened by its one end 210 to the seat cover 40 and by its other end 220 to the side wall 80 of the receiving container 70.

If the airbag 100 is now inflated, the airbag 100 is deployed again above the receiving container 70 and exerts a pressure against the seat cover 40. This pressure causes the predetermined breaking point 150 to tear. In contrast to the occupant protection device according to FIGS. 1a and 1b, bulging of the seat cover 40 cannot occur because the seat cover 40 is namely fixed to the side wall 80 of the receiving container 70 in the region of the opening 110 of the receiving container 70. This fixing reliably prevents a "migration" of the seat cover 40 or a "bulging" of the seat cover 40. The expanding airbag 100 must therefore inevitably tear open the predetermined breaking point 150 and thus create an opening "to the outside".

Since the migration or bulging of the seat cover 40 is reliably avoided in the occupant protection device according to FIGS. 2a and 2b, a very rapid opening of the airbag 100 is ensured.

Figure 2C:
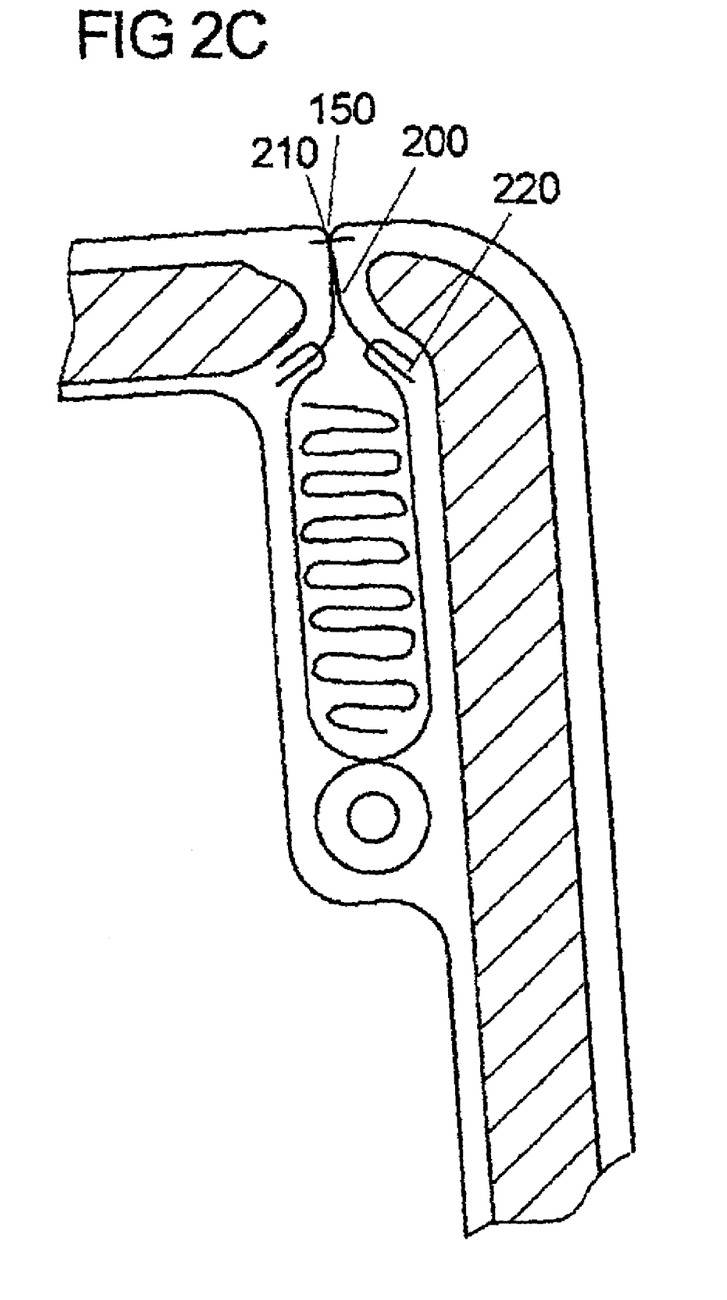

FIG. 2c shows an alternative embodiment wherein the seat cover 40 is fixed to the receiving container 70 in a different manner using two fastening elements 200 and 200'.

Figure 3:
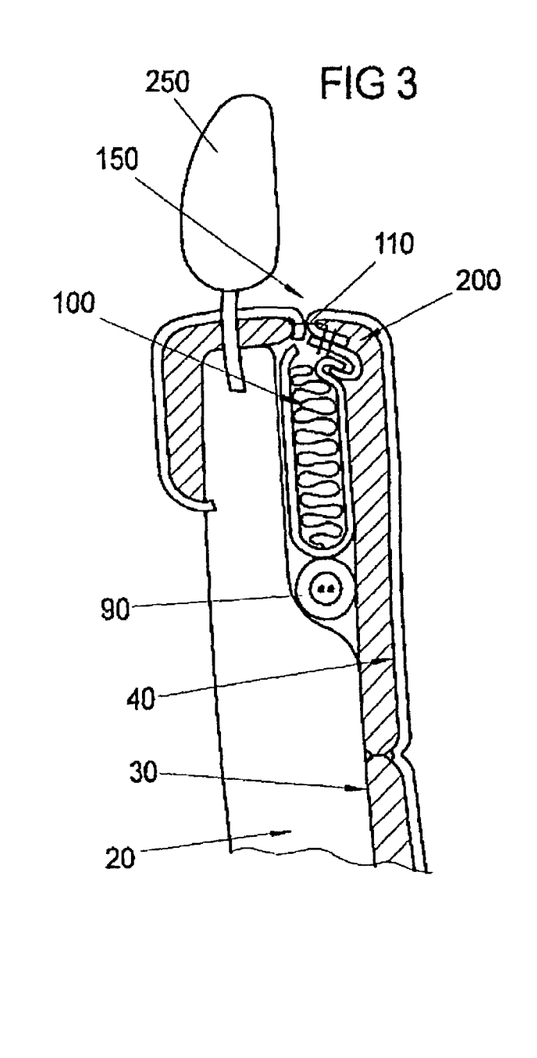
FIG. 3 shows an exemplary embodiment for an occupant protection device according to the invention, in which the seat cover is fastened in the upper region of the side wall of the receiving container.

FIG. 3 shows the occupant protection device according to the invention from FIGS. 2a and 2b once again in a different illustration. The vehicle seat 10 with the seat cushion 30, the seat cover 40 and the backrest frame 20 can be seen. The occupant protection device 50 is integrated in the vehicle seat 10. Moreover, a head restraint 250 which is fastened to the top of the vehicle seat 10 can be seen in FIG. 3.

Figure 4:
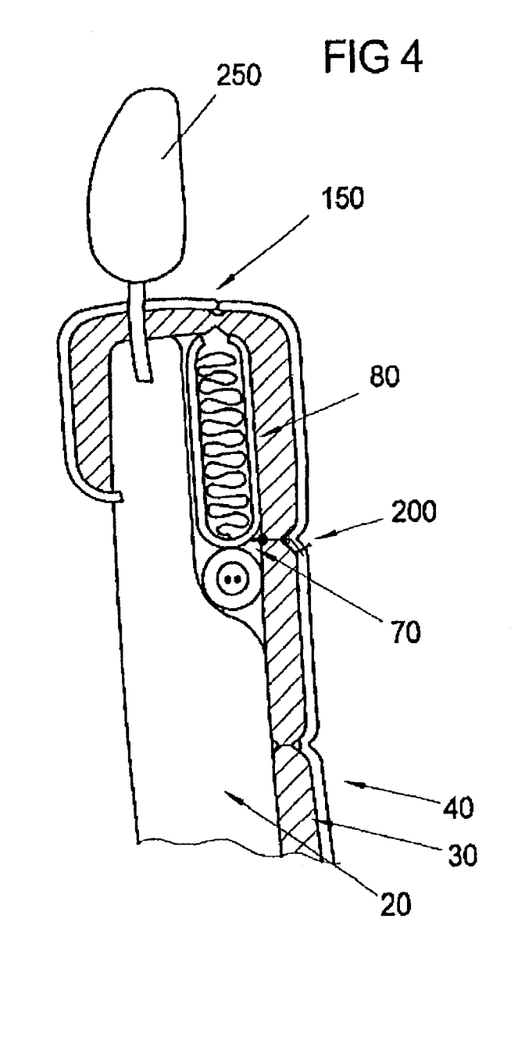
FIG. 4 shows an exemplary embodiment for an occupant protection device according to the invention, in which the seat cover is fastened in the lower region of the side wall of the receiving container.

FIG. 4 illustrates an exemplary embodiment for an occupant protection device according to the invention, in which the seat cover 40 is fastened in the lower region of the side wall 80 of the receiving container 70. FIG. 4 specifically shows that the fastening means 200 is fastened to that region of the side wall 80 which is adjacent to the filling pipe 90. A tearing seam 150 is provided above the opening 110 of the receiving container 70 as the predetermined breaking point.

Figure 5:
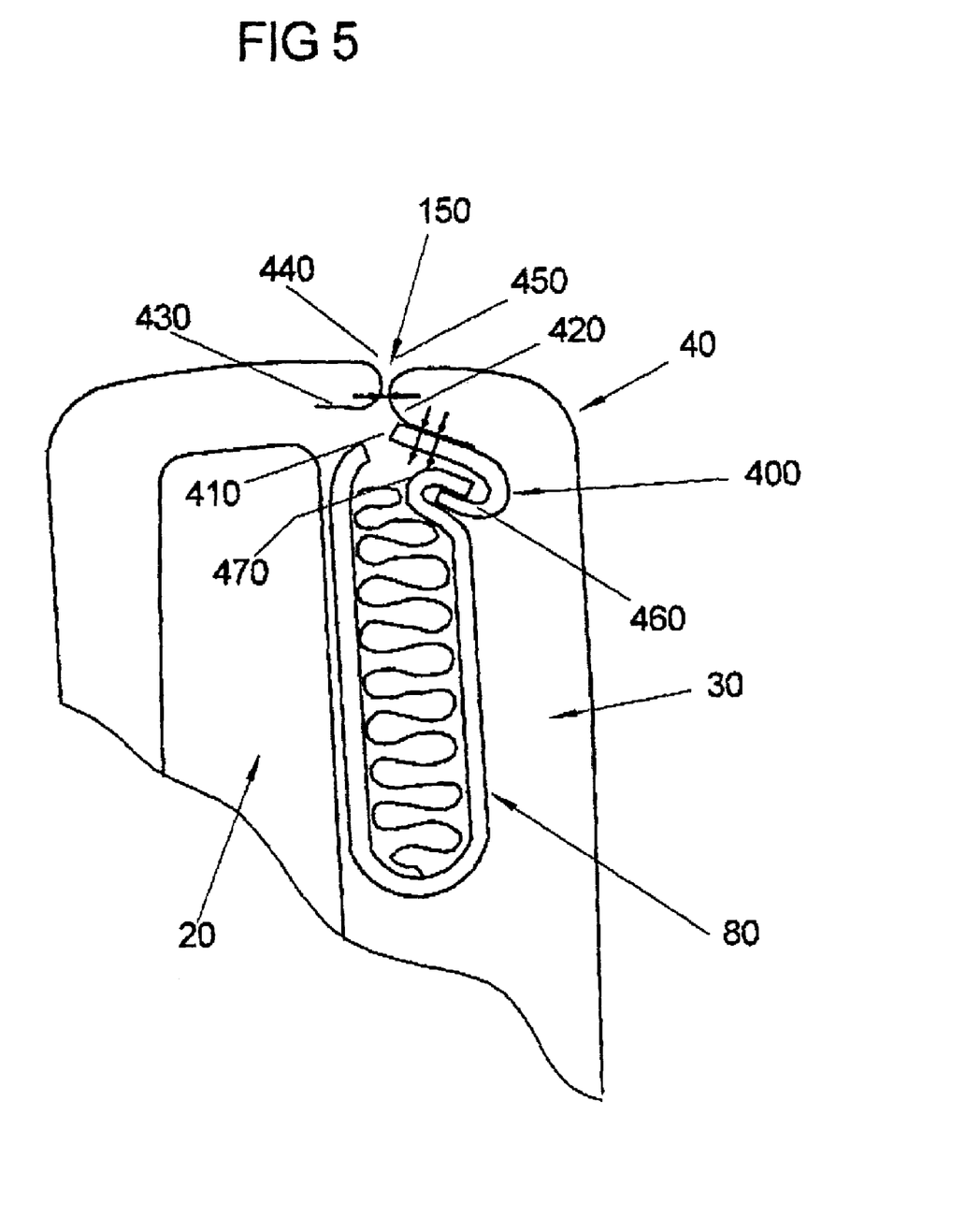
FIG. 5, 5a shows two exemplary embodiments for an occupant protection device according to the invention with a plastic strip for hooking the seat cover in on a side wall of the receiving container.

FIG. 5 shows an exemplary embodiment for an occupant protection device according to the invention, in which a plastic strip 400 is provided for fastening the seat cover 40 to the side wall 80 of the receiving container 70. In the occupant protection device according to FIG. 5, the side wall 80 is bent in its upper region in such a manner that the plastic strip 400 can be attached into the side wall 80. In order to fasten the plastic strip 400, the strip is sewn on its one strip side 410 to a hem 420 of the seat cover 40. In this case, the hem 420 is formed by the seat cover 40 being folded over twice into the seat interior in the region of the tearing seam 150. The one hem 420 and a second hem 430 are produced by this folding-over process. The edge regions 440 and 450 of the two hems are adjacent to each other and are sewn to each other by the tearing seam 150.

The other strip side 460 of the plastic strip 400 is of bent design and can therefore be hooked into the likewise bent, upper region 470 of the side wall 80. For this purpose, the other strip side 460 has a "mating shape" to the upper region 470 of the side wall 80.

Figure 5A:
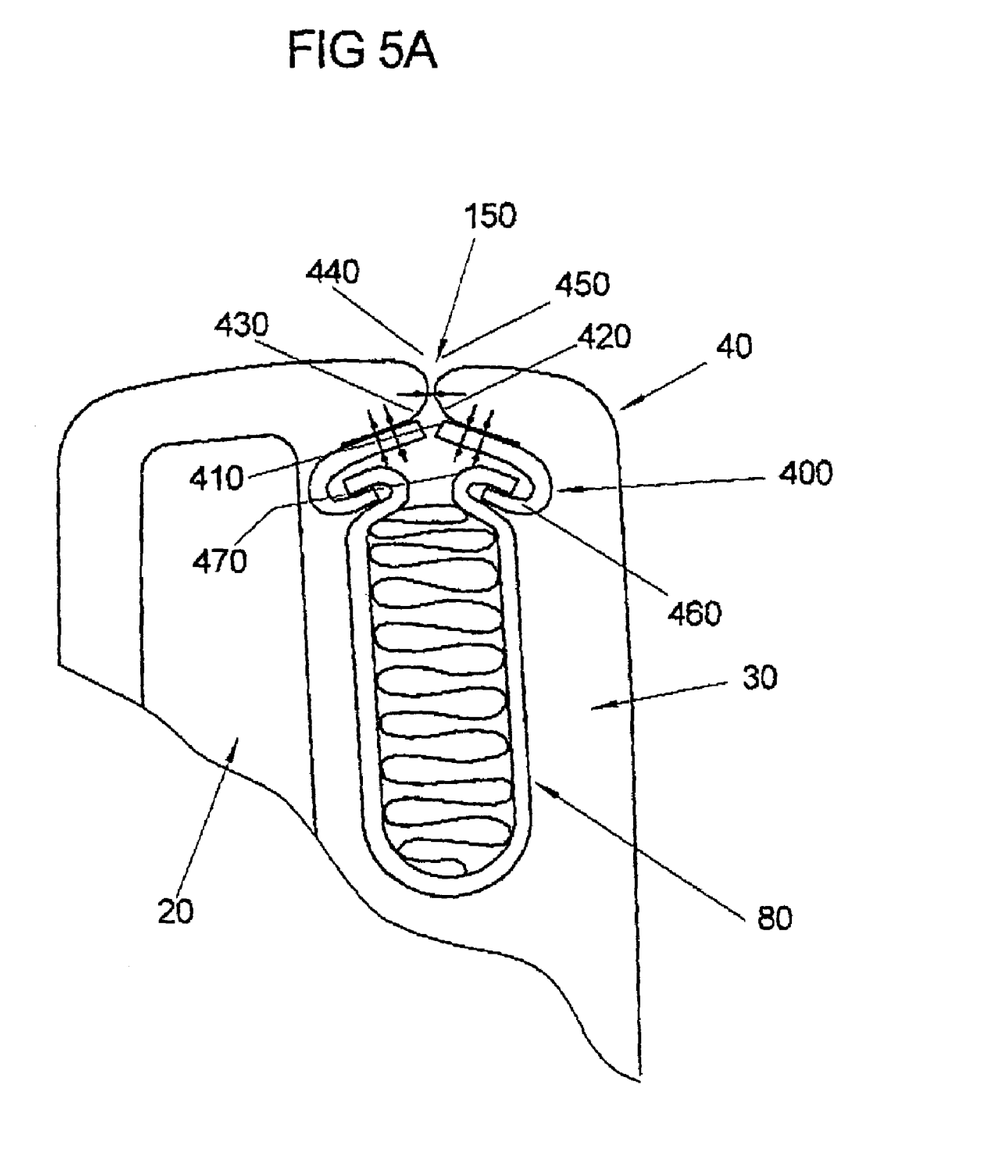

According to FIG. 5, only the hem 420 is fixed to the side wall 80. In the same manner, the second hem 430 may also be fixed to the side wall 80. For instance, both hems 420 and 430 may be fixed to the side wall 80 (see FIG. 5a). In the latter case, the hem 420 is preferably fixed to the front part (in driving direction) of the side wall and the second hem 430 is connected to the rear part (in driving direction) of the side wall.

Figure 6:
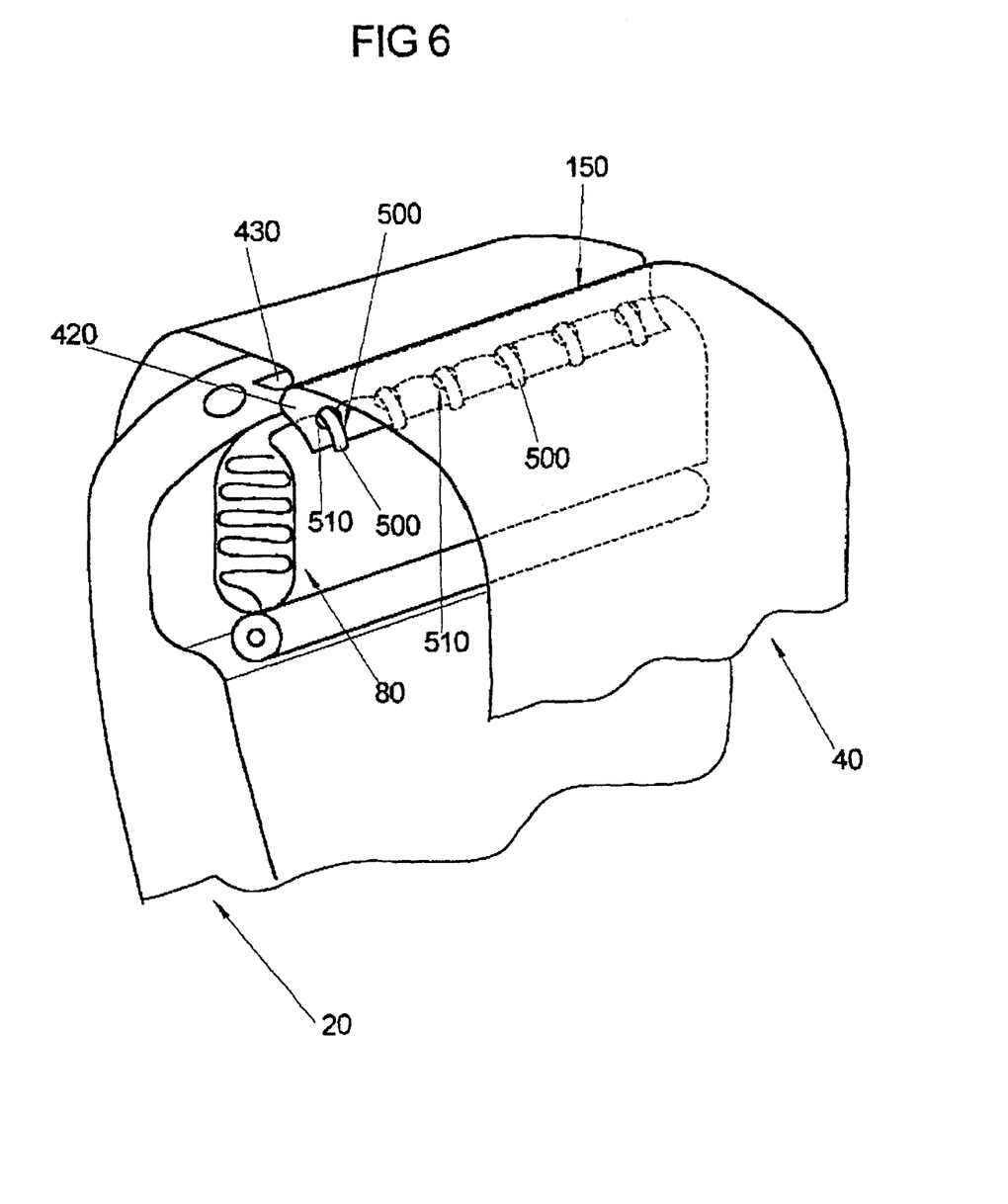
FIG. 6 shows an exemplary embodiment for an occupant protection device according to the invention, in which hooks on the side wall of the receiving container serve for the "attachment" of the seat cover.

FIG. 6 shows an exemplary embodiment for an occupant protection device according to the invention, in which hooks 500 are provided on the side wall 80 of the receiving container 70.

The hem 420 of the seat cover 40 has holes 510, the distances of which from one another correspond to the distance between the hooks 500.

In order to fasten the seat cover 40 to the side wall 80 of the receiving container 70, the holes 510 of the hem 420 are hooked into the hooks 500 of the side wall 80, thus resulting in fastening of the hem 420.

It can moreover be seen in FIG. 6 that the hem 420 and the further hem 430 of the seat cover 40 are sewn to each other by the tearing seam 150.

According to FIG. 6, only the hem 420 is fixed to the side wall 80. In the same manner, the second hem 430 may also be fixed to the side wall 80.

Figure 7A:
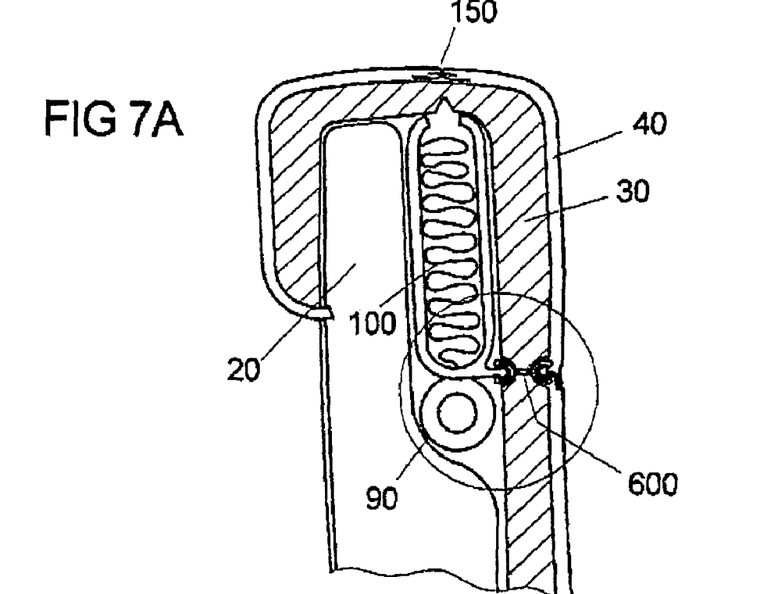
FIGS. 7a and 7b show an exemplary embodiment of the occupant protection device according to the invention, in which a snap-in strip which is integrated in the seat cushion is provided.
Figure 7B:
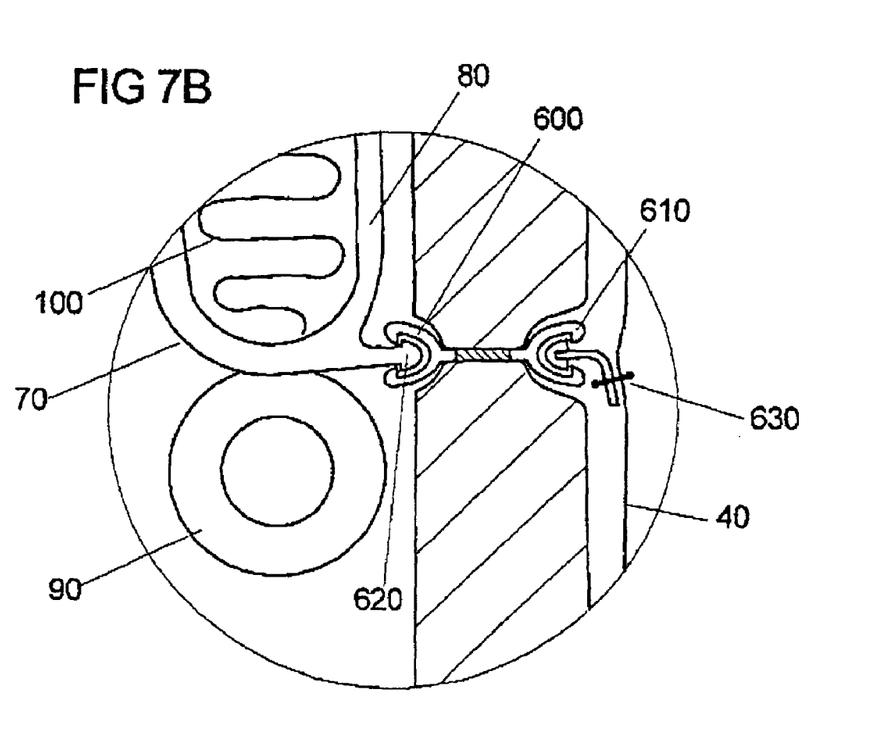

FIGS. 7a and 7b show an exemplary embodiment for an occupant protection device, in which the fixing of the seat cover 40 takes place in the lower region of the receiving container 70, as has already been explained further above in conjunction with FIG. 4.

In the exemplary embodiment according to FIGS. 7a and 7b, a snap-in strip 600 is provided to which snap-in hooks 610 and further snap-in hooks 620 are fastened. The snap-in hooks 610 are sewn firmly to the seat cover 40, for example by means of seams 630. The further snap-in hooks 620 are fastened directly to the side wall 80 of the receiving container 70.

It can moreover be seen in FIGS. 7a and 7b that the snap-in strip 600 is incorporated—for example foamed—into the seat cushion 30. In other words, the snap-in strip 600 is thus part of the seat cushion 30, on which the snap-in hooks 610 of the seat cover 40 are latched on the one side and the further snap-in hooks 620 of the side wall 80 are latched on the other side.

Figure 8:
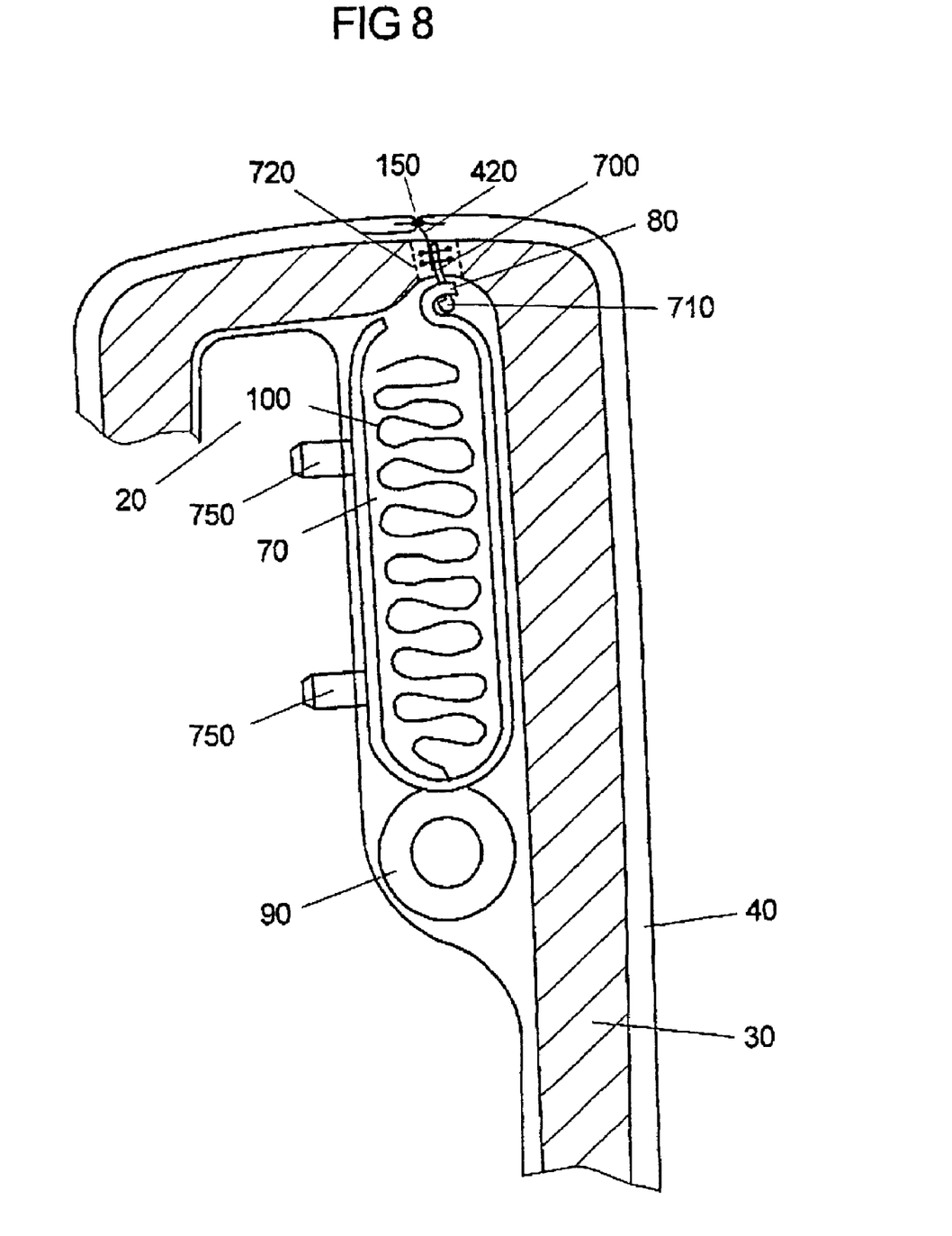
FIG. 8 shows an exemplary embodiment for an occupant protection device according to the invention, in which hooks of a plastic rail, which is fastened to the seat cover, are latched in on the side wall of the receiving container.

FIG. 8 shows an exemplary embodiment for the occupant protection device according to the invention, in which a plastic rail 700 is sewn on at the one hem 420 of the seat cover 40. A hook 710—or a plurality of hooks 710—is/are fastened to the plastic rail 700; each of these hooks 710 is guided in each case through a hole 720 in the seat cushion 30.

The holes 720 serve, on the one hand, to ensure the connection of the hook 710 or of the hooks 710 to the side wall 80 of the receiving container 70; on the other hand, they also serve to form a predetermined breaking point in the seat cushion 30. This is because if the airbag 100 is to be deployed, then in addition to the tearing seam 150 the seat cushion 30 also has to be opened. Such an opening or "breaking open" or "tearing open" of the seat cushion 30 is significantly facilitated by the holes 720 in the seat cushion 30.

As an alternative, the holes 720 in the seat cushion 30 may also be replaced by a gap in the seat cushion 30, through which the hooks 710 of the plastic rail 700 are then guided to the side wall 80 of the receiving container 70. In contrast to such a gap, the holes 720 have the advantage that the upper region of the seat cushion 30 is overall more stable, as a result of which the seat cover 40 fits more snugly against the seat cushion 30 and, in particular, a wavy formation of the seat cover 40 on the seat cushion 30 is avoided.

FIG. 8 furthermore shows fastening elements 750 which are used to fasten the receiving container 70 and therefore the airbag module 60 to the backrest frame 20 of the vehicle seat 10.

The priority application DE 102 44 866.3-42 filed on Sep. 23, 2002 is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protection device located in a vehicle seat comprising: a receiving container for an airbag, wherein the receiving container is free of closure flaps and the opening of the receiving container is covered by a seat cover of the vehicle seat,
    wherein the seat cover is fastened to a side wall of the receiving container so that, when the airbag is inflated with gas, the seat cover tears open in the region of the opening of the receiving container, and
    wherein an upper end of at least one sidewall of the container is bent away from the container opening such that a hook-shaped sidewall area is formed at the outside of the sidewall, the hook-shaped sidewall area comprises a hook opening that is directed away from the container opening.

2. The occupant protection device according to claim 1, wherein the seat cover has a predetermined breaking point in the region of the opening of the receiving container.

3. The occupant protection device according to claim 2, wherein the seat cover is fastened to the side wall in the region of the predetermined breaking point.

4. The occupant protection device according to claim 2, wherein the predetermined breaking point is formed by a seam configured to tear.

5. The occupant protection device according to claim 4, wherein the seat cover is folded over into the seat interior in the region of the tearing seam forming two adjacent hems, and wherein the adjacent edge regions of the hems are sewn together.

6. The occupant protection device according to claim 5, wherein at least one of the two hems is fastened to the side wall of the receiving container.

7. The occupant protection device according to claim 1, wherein the receiving container is arranged in the vehicle seat in such a manner that the side wall is arranged essentially parallel to the backrest and the opening of the receiving container faces the upper end of the backrest.

8. The occupant protection device according to claim 1, wherein the seat cover is fastened to the side wall of the receiving container which faces the vehicle occupant.

9. The occupant protection device according to claim 1, wherein a plastic strip is provided for fastening the seat cover to the side wall of the container.

10. An occupant protection device located in a vehicle seat comprising:
    a receiving container for an airbag, the receiving container is free of closure flaps and the opening of the receiving container is covered by a seat cover of the vehicle seat, and wherein the seat cover is fastened to a side wall of the receiving container so that, when the airbag is inflated with gas, the seat cover tears open in the region of the opening of the receiving container; and
    a plastic strip, the plastic strip being provided for fastening the seat cover to the side wall of the container, wherein one end of the strip is sewn to the seat cover and the other end of the strip is hooked to the side wall.

11. The occupant protection device according to claim 1, wherein the fastening of the seat cover to the side wall is brought about by at least two hooks which are attached to the side wall and are hooked into holes in a hem of the seat cover.

12. The occupant protection device according to claim 1, wherein the fastening of the seat cover to the side wall is brought about by a snap-in strip into which snap-in hooks fastened to a seat cover snap.

13. The occupant protection device according to claim 12, wherein the snap-in strip is fastened to the side wall.

14. The occupant protection device according to claim 13, wherein the snap-in strip is fastened to the side wall via further snap-in hooks.

15. The occupant protection device according to claim 1, wherein the seat cover is fastened to a low region of the side wall.

16. The occupant protection device according claim 1, wherein a seat cushion is provided between the receiving container and the seat cover, and there is at least one predetermined breaking point in the seat cushion.

17. The occupant protection device according to claim 16, wherein at least one hole is provided in the seat cushion as a predetermined breaking point in the seat cushion.

18. An occupant protection device, comprising: an airbag stored in a container located in a vehicle seat, wherein the container includes an open end covered by a seat cover; and wherein the seat cover is connected to the container by a plastic strip, and
    wherein an upper end of at least one sidewall of the container is bent away from the open end such that a hook-shaped sidewall area is formed at the outside of the sidewall, the hook-shaped sidewall area comprises a hook opening that is directed away from the open end.

19. The occupant protection device according to claim 1, wherein the hook-shaped sidewall area is U-shaped in cross-section, an opening of the U-shape is directed away from the container opening.

* * * * *